W. E. HOLLAND.
PRIMARY BATTERY.
APPLICATION FILED DEC. 8, 1909.
1,167,499.
Patented Jan. 11, 1916.
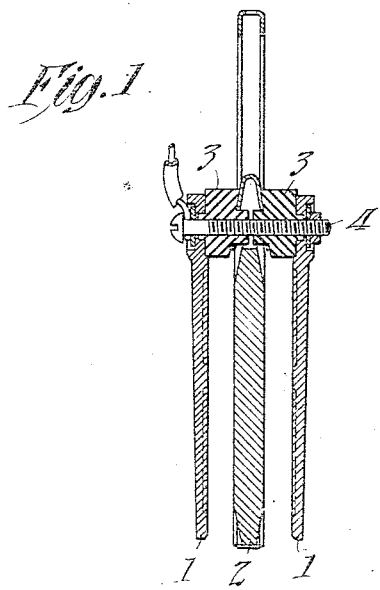
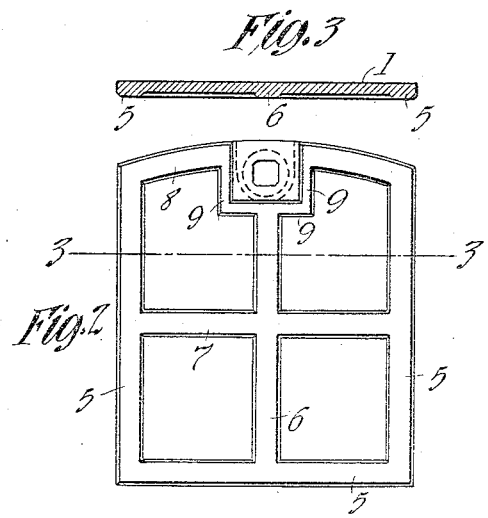
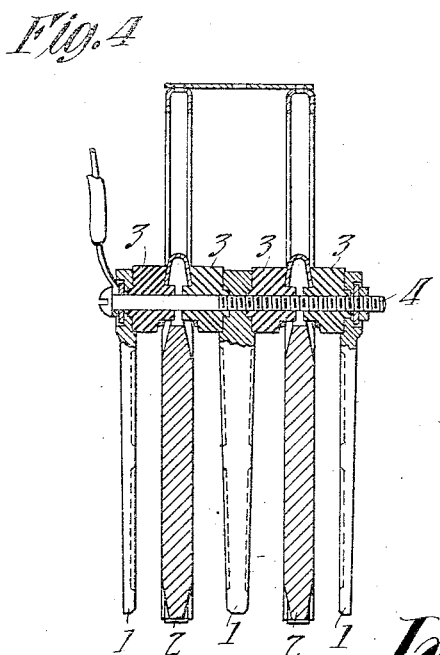
Witnesses:
Frank D. Lewis
Dyer Smith
Inventor:
Walter E. Holland,
by Frank L. Dyer
his Atty.

UNITED STATES PATENT OFFICE.

WALTER E. HOLLAND, OF EAST ORANGE, NEW JERSEY, ASSIGNOR, BY MESNE ASSIGN-
MENTS, TO NEW JERSEY PATENT COMPANY, OF WEST ORANGE, NEW JERSEY, A
CORPORATION OF NEW JERSEY.

PRIMARY BATTERY.

1,167,499.      Specification of Letters Patent.      Patented Jan. 11, 1916.

Application filed December 8, 1909. Serial No. 532,094.

*To all whom it may concern:*

Be it known that I, WALTER E. HOLLAND, a citizen of the United States, and a resident of East Orange, in the county of Essex and State of New Jersey, have invented certain new and useful Improvements in Primary Batteries, of which the following is a description.

My invention relates to improvements in primary of voltaic batteries of that class in which the negative electrode consists in a plate of oxid of copper or other depolarizing agent, and the positive electrode consists of a plate or plates of zinc. It should be stated that by positive electrode I mean the plate from which current flows through the electrolyte to the other or negative electrode, from which current flows through the outside circuit,—the negative electrode, as I term it, thus constituting the positive pole of the battery.

My invention is an improvement on that described in patent to Eben G. Dodge, No. 894,487, for primary batteries, patented July 28, 1908, and the object of my invention is to so construct the positive plates of batteries of the class described that the latter shall have a higher and more uniform voltage and a higher discharge rate than have batteries as commonly constructed, without proportionate increase in the amount of material used in the construction of the plate, and shall have increased efficiency and life. My invention consists further in the details of construction and combinations of parts hereinafter more particularly described and claimed.

In the usual construction of batteries of this class as heretofore made, the zinc or positive electrode plate is considerably smaller than the adjacent copper oxid or negative electrode plate, which extends below the zinc plate and beyond it on each side. Such a construction is shown in the patent to Dodge above mentioned. In the electrolytic action of such a cell the zinc plate is rapidly worn away at the edges because the areas of the negative plate extending beyond the positive plate, having no positive plate area directly opposite from which to draw current, draw it from the most available points, which are the plate edges. The current density and consequent dissolution of the zinc are therefore much greater at the edges than elsewhere. The result of this construction is therefore the continual shortening and narrowing of the positive plate or plates, with consequent loss of efficiency and voltage or discharge rate; while there is considerable waste of copper oxid in the portions of the negative plate which have no zinc opposed thereto. By forming the positive plates of substantially the same size and shape as the negative plates opposed thereto, this loss is practically eliminated. In any correctly proportioned cell of this type a certain percentage of zinc, say 60 to 70 per cent., in excess of the amount that will be used in generating the rated output of current is provided. This is advisable in order to maintain the full amount of active surface to the end of the discharge and thus to insure the efficient working of the cell throughout its life. Increasing the size of the ordinary zinc plate therefore necessitates an almost proportional increase in weight and cost of the zinc.

My invention makes it possible to maintain the full amount of active surface of the positive plate down to the end of discharge with a much smaller percentage of zinc in excess of the theoretical required amount, or to greatly increase the size of a plate while only slightly increasing its weight. This I do by forming the positive plate or plates with an integral flange or rib upon its surface, or a plurality of such ribs, whereby the body of the plate may be made much thinner than it would otherwise have to be in order to maintain its shape after it has been considerably consumed. I prefer to form the plate with a flange adjacent to its edges or the side thereof nearest to the adjacent negative plate, and also to provide strengthening ribs across the surface of the plate between the flanges described. My improved plate, therefore, has thickened edges and is provided with one or more strengthening ribs. A plate so constructed maintains its shape; and the provision of the flanges on the side specified adds somewhat to the amount of active surface. It is however obvious that the flanges and ribs might be provided upon the side farthest from the adjacent negative plate with nearly as great advantage, and within the scope of my invention.

It may be noted that in a ribbed zinc plate constructed as above described and designed for the standard type of cell the increase in surface over the old style zinc plate is 62.6 per cent., while the corresponding increase in weight is only 11.4 per cent.

Referring to the accompanying drawings forming part of this specification, Fig. 1 illustrates a transverse vertical section through a negative and two positive plates mounted together for insertion in the electrolyte of a cell and embodying my invention. Fig. 2 is a side elevation of a positive electrode plate embodying my invention, the drawing representing the side thereof which is adapted to be placed toward the negative plate. Fig. 3 is a cross section on line 3—3 of Fig. 2. Fig. 4 is a section similar to that illustrated in Fig. 1 representing the arrangement of elements in a cell having a plurality of negative plates and a plurality of positive plates.

In all of the above drawings the same reference characters will be used to denote corresponding parts.

Referring to the drawings, the positive plates 1, 1, 1 are spaced from the negative plates 2, 2 by means of insulators 3, 3, the parts being secured together by means of the bolt 4 which extends from the upper portion of the plates through the insulators. The positive plates 1 have ribs or flanges 5 formed on their sides, preferably on those sides nearest to the negative plates, these ribs or flanges extending adjacent to the lower edge of the plate, and preferably also extending adjacent to the side edges and upper edge of the same side of the plate. Preferably, also, the plate is formed with a vertical strengthening rib 6 midway between the side flanges 5, 5, and with a horizontal strengthening rib 7 about midway between the upper and lower horizontal flanges. It is, however, obvious that a different number of strengthening ribs might be employed if desired, spaced in a different manner. The upper horizontal flange 8 is interrupted for the reception of the end of insulator block 3, the flange 8 being continued around the sides and lower edge of the insulator 3 as shown at 9, 9 in the drawings, the lower edge of flange 9 joining the top of vertical strengthening rib 6 and being continuous therewith.

In cells employing two positive plates and one negative plate, as illustrated in Fig. 1, the positive plates preferably are flanged and strengthened as described only on the sides nearest the negative plate. I may, however, form a cell in the manner illustrated in Fig. 4, in which two negative plates are used and three positive plates, one of these being placed between the two negative plates and one on the outer side of each of the negative plates. In this construction, the two outside positive plates are flanged and ribbed only on the inner sides or the sides directed toward the negative plates 2, while the middle positive plate 1 is flanged and ribbed upon both sides, since it is between two negative plates. This negative plate is also formed thicker than the two outside plates.

Having now described my invention, what I claim and desire to protect by Letters Patent is as follows:

1. In a primary battery, a substantially homogeneous zinc electrode plate having its edges thickened to prevent reduction in effective area during the operation of the battery and having strengthening ribs extending from said thickened edges across said plate integrally therewith, substantially as described.

2. In a primary battery, a flat substantially homogeneous zinc electrode plate having its edges thickened to prevent reduction in effective area during the operation of the battery and having a strengthening rib formed upon its surface and extending from a thickened edge portion of said plate integrally therewith, substantially as described.

This specification signed and witnessed this 4th day of December 1909.

WALTER E. HOLLAND.

Witnesses:
DYER SMITH,
JOHN M. CANFIELD.

It is hereby certified that in Letters Patent No. 1,167,499, granted January 11, 1916, upon the application of Walter E. Holland, of East Orange, New Jersey, for an improvement in "Primary Batteries," an error appears in the printed specification requiring correction as follows: Page 1, line 10, for the word "of", first occurrence, read *or;* and that the said Letters Patent should be read with this correction therein that the same may conform to the record of the case in the Patent Office.

Signed and sealed this 25th day of April, A. D., 1916.

[SEAL.]                              J. T. NEWTON,

Cl. 204—49.                        *Acting Commissioner of Patents.*